US011316931B2

(12) United States Patent
Mashinter

(10) Patent No.: US 11,316,931 B2
(45) Date of Patent: *Apr. 26, 2022

(54) PROTOCOL TO INITIATE SESSION WITH PARTNER SITE

(71) Applicant: Adobe Inc., San Jose, CA (US)

(72) Inventor: Allan Keith Mashinter, Toronto (CA)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,193

(22) Filed: Oct. 12, 2020

(65) Prior Publication Data
US 2021/0029203 A1 Jan. 28, 2021

Related U.S. Application Data

(63) Continuation of application No. 16/040,479, filed on Jul. 19, 2018, now Pat. No. 10,826,998.

(51) Int. Cl.
H04L 29/08 (2006.01)
H04L 12/24 (2006.01)
(Continued)

(52) U.S. Cl.
CPC ........ H04L 67/141 (2013.01); H04L 41/0806 (2013.01); H04L 63/10 (2013.01); H04L 65/1003 (2013.01)

(58) Field of Classification Search
CPC ............... H04L 67/141; H04L 41/0806; H04L 41/5054; H04L 63/10; H04L 63/102;
(Continued)

(56) References Cited

U.S. PATENT DOCUMENTS 8,893,294 B1 * 11/2014 Steele, III ........... G06F 16/9574
726/26
9,148,468 B1 * 9/2015 Gildfind .............. H04L 67/2833
(Continued)

FOREIGN PATENT DOCUMENTS

CN 1545818 11/2004
CN 1870539 11/2006
(Continued)

OTHER PUBLICATIONS

"Non-Final Office Action", U.S. Appl. No. 16/040,479, dated Apr. 2, 2020, 11 pages.
(Continued)

Primary Examiner — Alina A Boutah
(74) Attorney, Agent, or Firm — FIG. 1 Patents

(57) ABSTRACT

A protocol to initiate a session with a partner site in a digital medium environment is described. Systems that initiate partner-site sessions according to this improved protocol reduce exposure of sensitive information in relation to conventional systems that leverage conventional protocols. According to the improved protocol, a system initiating a partner-site session—to obtain functionality from a respective service provider system—creates a hidden storage area (e.g., an iframe) in a local security context. The system then uses this hidden storage area to store session information—which may include sensitive, personally identifying information—rather than using storage of the respective service provider system. By avoiding communication of sensitive information for storage by the service provider system, the system does not expose the sensitive information. Due to this, the system reduces a number of opportunities for maliciously acquiring that information.

20 Claims, 8 Drawing Sheets

(51) Int. Cl.
*H04L 29/06* (2006.01)
*H04L 67/141* (2022.01)
*H04L 41/0806* (2022.01)
*H04L 65/10* (2022.01)

(58) Field of Classification Search
CPC ............ H04L 65/1003; H04L 65/4084; H04L 65/1006; G06F 21/62
See application file for complete search history.

(56) References Cited

U.S. PATENT DOCUMENTS

| | | | | |
|---|---|---|---|---|
| 10,135,776 | B1* | 11/2018 | Brown | H04L 51/00 |
| 10,826,998 | B2* | 11/2020 | Mashinter | H04L 63/102 |
| 2006/0293984 | A1* | 12/2006 | Loch | G06Q 40/00 705/35 |
| 2007/0233857 | A1* | 10/2007 | Cheng | G06Q 30/02 709/224 |
| 2010/0293240 | A1 | 11/2010 | Lee et al. | |
| 2012/0254904 | A1* | 10/2012 | Brown | G06F 9/541 719/328 |
| 2013/0074158 | A1* | 3/2013 | Koskimies | G06F 21/6263 726/4 |
| 2013/0111584 | A1* | 5/2013 | Coppock | H04L 63/145 726/22 |
| 2014/0068722 | A1* | 3/2014 | Hayat | H04L 63/102 726/4 |
| 2014/0129920 | A1* | 5/2014 | Sheretov | H04L 63/0281 715/234 |
| 2015/0019691 | A1* | 1/2015 | Sarat | G06F 40/134 709/219 |
| 2015/0081562 | A1* | 3/2015 | Roullier | G06Q 30/0615 705/50 |
| 2015/0358363 | A1* | 12/2015 | Park | H04L 12/12 709/227 |
| 2018/0013840 | A1* | 1/2018 | Mitevski | H04L 67/146 |
| 2018/0288162 | A1* | 10/2018 | Figueroa | H04L 63/0838 |
| 2018/0351936 | A1* | 12/2018 | Battacharya | H04L 63/12 |
| 2019/0068723 | A1* | 2/2019 | Drasin | H04L 67/10 |
| 2020/0028916 | A1 | 1/2020 | Mashinter | |

FOREIGN PATENT DOCUMENTS

| | | |
|---|---|---|
| CN | 101443749 | 5/2009 |
| CN | 101465826 | 6/2009 |
| CN | 102474432 | 5/2012 |
| CN | 102664909 | 9/2012 |
| CN | 106716921 | 5/2017 |
| WO | WO-2015038948 | 3/2015 |

OTHER PUBLICATIONS

"Notice of Allowance", U.S. Appl. No. 16/040,479, dated Jun. 29, 2020, 7 pages.
"Pre-Interview First Office Action", U.S. Appl. No. 16/040,479, dated Apr. 13, 2020, 6 pages.
"Search Report", GB Application No. 1903407.3, dated Aug. 29, 2019, 4 pages.
"Examination Report", AU Application No. 2019201785, dated Jul. 9, 2021, 3 pages.
"Foreign Notice of Acceptance", AU Application No. 2019201785, dated Jul. 30, 2021, 4 pages.
"Foreign Office Action", CN Application No. 201910143486.7, dated Jan. 5, 2022, 10 pages.

* cited by examiner

US 11,316,931 B2

PROTOCOL TO INITIATE SESSION WITH PARTNER SITE

RELATED APPLICATION

This application is a continuation of and claims priority to U.S. patent application Ser. No. 16/040,479, filed Jul. 19, 2018, which is incorporated by reference herein in its entirety.

BACKGROUND

Advances in computing technology enable computing systems to provide services across networks, such as the Internet, to other computing devices. By way of example, these advances enable service provider systems to provide various services across networks to client devices. The variety of services provided by these service provider systems is diverse and continues to grow. In part, this enables users to interact with their devices in a seemingly infinite number of ways. Examples of these various services include social networking services, content-provision services (e.g., stock content, streaming video, streaming audio, and so forth), content creation and editing services, cloud-storage services, productivity-suite services, gaming services, location-based services, fitness-tracking services, financial services, home-automation services, and so forth.

In some cases, the services of these service provider systems can be provided together. For instance, one social networking service may provide access via a user interface to services of another social networking service, a cloud-storage service may provide access via a user interface to services of a productivity-suite service (e.g., to perform operations on data files maintained by the cloud-storage service), and so on. In general, service provider systems that enable provision of such combined services are referred to as "partners." In order to provide such combined services, the corresponding service provider systems establish partner-site sessions, which enable interaction for providing the respective services in a combined manner. Initiation of these partner-site sessions is generally controlled by a protocol for initiating partner-site sessions. However, conventional systems for initiating partner-site sessions do so according to conventional protocols that cause sensitive information (e.g., personally identifying information) to be exposed at various points throughout the initiation. Accordingly, these conventional systems fail to suitably protect sensitive information when providing combined services from multiple service provider systems.

SUMMARY

A protocol to initiate a session with a partner site and overcome these problems is described. Systems that initiate partner-site sessions according to this improved protocol reduce exposure of sensitive information in relation to conventional systems that leverage conventional protocols. According to the improved protocol, a system initiating a partner-site session—to obtain functionality from a respective service provider system—creates a hidden storage area (e.g., an iframe) in a local security context. The system then uses this hidden storage area to store session information—which may include sensitive, personally identifying information—rather than using storage of the respective service provider system. By avoiding communication of sensitive information for storage by the service provider system, the system does not expose the sensitive information. Due to this, the system reduces a number of opportunities for maliciously acquiring that information.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
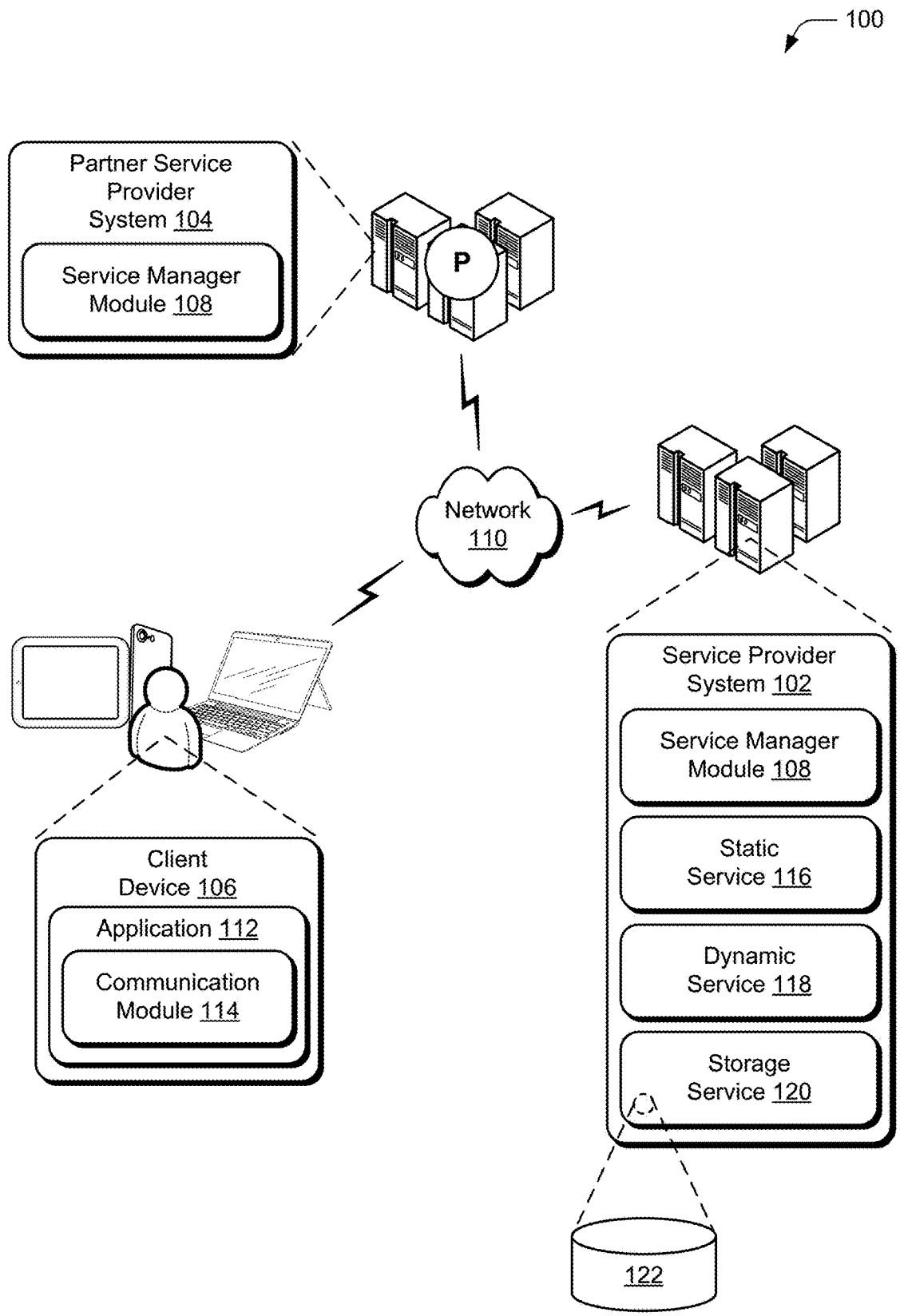
FIG. 1 is an illustration of an environment in an example implementation that is operable to employ techniques described herein.

Advances in computing technology enable computing systems (e.g., service providers) to provide services across networks to other computing devices (e.g., client devices). Indeed, the variety of services provided by these service provider systems is diverse and continues to grow, which enables users to interact with their devices in a seemingly infinite number of ways. In some cases, the services of these service provider systems can be provided together. In order to work together, the corresponding service provider systems establish partner-site sessions, which enable interaction between the providers to provide the respective services in a combined manner. However, conventional systems for initiating partner-site sessions do so according to protocols that involve exposure of sensitive information at various points throughout the initiation. Accordingly, these conventional systems fail to suitably protect sensitive information when providing combined services from multiple service provider systems.

An improved protocol to initiate a session with a partner site and overcome these problems is described. Broadly speaking, this protocol controls interactions between an application and a service provider system in connection with a partner site session, in which the application is used to provide services of multiple service providers in a combined manner and the service provider system provides at least one of those services upon request.

In contrast to conventional protocols, the improved protocol described herein directs an application, which receives a request for functionality involving interaction between multiple service provider systems, to initiate a partner session by creating a hidden storage area (e.g., an iframe) and launching the functionality using session information stored in this hidden storage area. The protocol thus enables the application to initiate the partner session without communicating session information for storage by a storage provider system. To initiate the partner session in this way, the protocol initially directs the application to collect session information describing a context in which the application surfaces the functionality of the multiple service providers. Depending on the functionality, this session information may include file names and location relative to which a requested functionality is to be performed, user account information (e.g., username and access credentials) to access data from a service provider system, state information indicative of a state of services being provided by service provider systems (e.g., a state in a computer game, scripting information, content currently and/or previously presented to the user), device identifying information, and so forth. Accordingly, some of the information collected may be personally identifying or otherwise sensitive. In accordance with the described techniques, the improved protocol further directs the application to create the hidden storage area in a security context of the application for storage of this session information. According to the protocol, the application then uses the information from the hidden storage area to provide the requested service in the security context of the application.

As discussed in more detail below, the protocol also directs the service provider system to support creation of the hidden storage area by the application. For example, the protocol directs the service provider to configure aspects of the hidden storage area using the provider's resources, such as hardware, computing time, and so forth. In one or more implementations, the protocol directs the service provider system to configure the aspects by communicating with the application, such communications including the iframe, hypertext markup language (HTML), and JavaScript for launching the partner session. After the application creates the hidden storage area in the security context according to the protocol, the protocol further directs the service provider system to provide the requested functionality within the security context of the application. The service provider system does this according to the protocol using an abstract, non-personally identifying session identifier generated for the partner session being initiated. By leveraging this abstract information, the requested functionality is provided without communicating sensitive information to the service provider.

When a partner session is initiated according to the improved protocol, there are fewer communications in which sensitive information is communicated outside a secure context of the application. As a result, the improved protocol involves less exposure of potentially sensitive information. By limiting a number of times that potentially sensitive information is exposed, the improved protocol reduces opportunities for that information to be maliciously obtained. Due to this, the improved protocol is more secure than conventional protocols for initiating partner-site sessions.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ a protocol to initiate a session with a partner site as described herein. The illustrated environment 100 includes a service provider system 102, a partner service provider system 104, and a client device 106. The service provider system 102 and partner service provider system 104 both include service manager module 108. The service provider system 102, partner service provider system 104, and client device 106 are communicatively coupled, one to another, via a network 110.

Computing devices that are usable to implement the service provider system 102, partner service provider system 104, and client device 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to low-resource devices with limited memory and/or processing resources (e.g., mobile devices). Additionally, a computing device may be representative of a plurality of different devices, such as multiple servers utilized by a business to perform operations "over the cloud" as further described in relation to FIG. 7.

As noted above, the service provider system 102 and the partner service provider system 104 are illustrated as including the service manager module 108 that is implemented at least partially in hardware of those systems to provide services accessible via the network 110. The service manager modules 108, for instance, may expose a website, web-based application, web-based service, or other functionality that is accessible via the network 110 by an application 112 of the client device 106 having a communication module 114. In accordance with the described techniques, the service manager modules 108 represent functionality to provide respective services of the multiple service providers, such as a combination of one or more services from the service provider system 102 (e.g., view, create, manipulate, print, and manage image files) in concert with one or more services from the partner service provider system 104 (e.g., cloud storage).

The communication module 114 may be configured in a variety of ways to obtain data from the service provider system 102 and the partner service provider system 104 over the network 110. This data is employed by the communication module 114 to enable a user of the client device 106 to communicate with the illustrated service provider systems to obtain information corresponding to the respective services, e.g., maintained computer file data when a service provider system provides a cloud-storage service, data for carrying out content-editing operations when a service provider system provides a content-editing service, and so forth. Further, this data is employed by the communication module 114 to communicate with multiple service providers to provide a combination of respective services in concert.

In this context, the application 112 leverages functionality of the communication module 114. By way of example, the application 112 surfaces the services of the service provider system 102 and the partner service provider system 104 by employing the communication module 114. In one or more implementations, the application 112 includes functionality to present a user interface (e.g., a graphical user interface, a voice-controlled user interface, and so on) via which a user of the client device 106 interacts to use the services of the service provider system 102 and the partner service provider system 104. To enable this interaction, the application 112 may be configured as a browser or other web-enabled application, for example. Regardless of particular implementation, the application 112 leverages functionality of the communication module 114 to provide combined services of the service provider system 102 and the partner service provider system 104 by initiating a session between them according to the protocol described in detail in relation to FIG. 3.

To provide various services, the service provider system 102 includes functionality represented by static service 116, dynamic service 118, and storage service 120, which is illustrated with storage 122. Broadly speaking, the static service 116 represents functionality to deliver service of the service provider system 102 using flat-file websites. With the static service 116, for instance, no programmable logic is used on the on the server side. However, the static service 116 is capable of serving digital content (e.g., web pages) with script (e.g., JavaScript) capable of running on the client side at the client device 106. In contrast, the dynamic service 118 represents functionality of the service provider system 102 to user server-side logic, such as by exposing callable application programming interface (API) functions and responding to calls made according to a received API call. The storage service 120 represents functionality of the service provider system 102 to store information, such as personally identifying information (PII) used in connection with providing one or more services. By way of example, a username and one or more cookies may be used by the service provider system 102 in connection with providing one or more services. The storage service 120 represents a functionality to store that information at least temporarily in the storage 122. In contrast to conventional techniques, however, the improved protocol described below enables the service provider system 102 and the partner service provider system 104 to provide integrated services in a way that does not use functionality of the storage service 120.

By adhering to the protocol described above and below, the application 112 initiates a session between the service provider system 102 and the partner service provider system 104 without leveraging the storage service 120 and also without leveraging the storage 122. Due in part to avoiding use of the storage service 120, the described protocol reduces opportunities at which PII can be maliciously obtained in relation to conventional techniques. This is because such PII is not stored remotely, e.g., by the storage service 120 in the storage 122, in accordance with the described protocol. Moreover and as described further below, the application 112 avoids communicating PII from the client device 106 by initiating an integrated-functionality session according to the described protocol.

Having considered an example environment, consider now a discussion of some example details of the techniques for a protocol to initiate a session with a partner site in accordance with one or more implementations.

Protocol to Initiate Session with Partner Site

Figure 2:
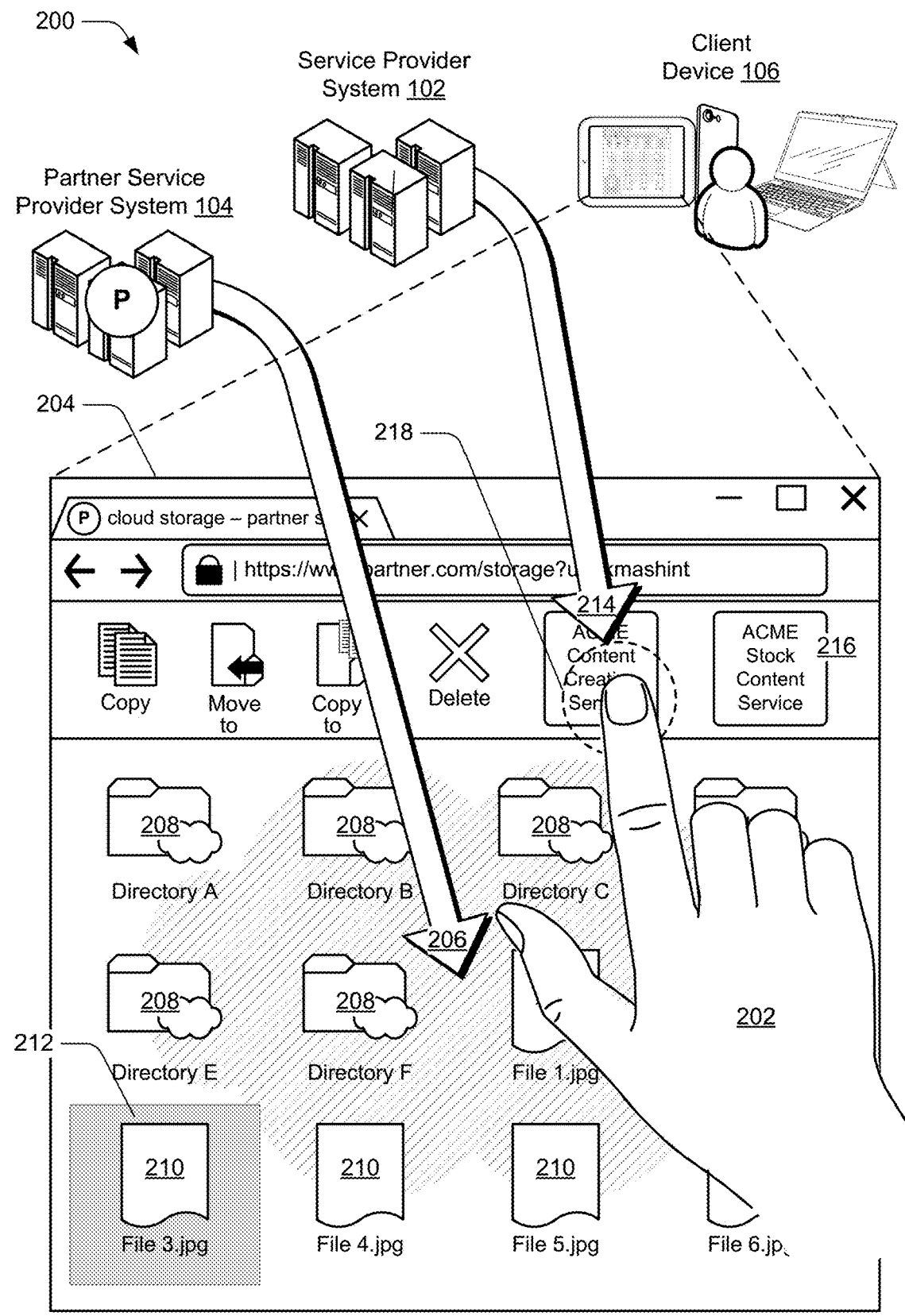
FIG. 2 depicts an example implementation in which a user interface presented by a client device includes instrumentalities for functionality that is surfaced using a session initiated with a partner site.

FIG. 2 depicts an example 200 of an implementation in which a user interface presented via a client device includes instrumentalities for functionality that is surfaced using a session initiated with a partner site. The illustrated example 200 includes from FIG. 1, the service provider system 102, the partner service provider system 104, and the client device 106. The illustrated example 200 also includes a hand of user 202 of the client device 106. The user 202's hand is depicted interacting with user interface 204, which is displayed via a display device of the client device 106.

In accordance with the described techniques, functionality provided by multiple service provider systems—the partner service provider system 104 and the service provider system 102—is surfaced for use by the user 202 of the client device 106. In this particular example, the functionality of the partner service provider system 104 and the service provider system 102 is surfaced via the user interface 204. With reference to FIG. 1, the user interface 204 may correspond to the application 112, e.g., the user interface 204 may be generated and displayed based on instructions executed by the application 112.

For purposes of clarity, the illustrated example 200 depicts the partner service provider system 104 providing a cloud-storage service and the service provider system 102—represented in the user interface 204 with the mark "ACME"—providing both a content creation service and a stock content service. It should be appreciated, however, that the partner service provider system 104 and the service provider system 102 may provide different services without departing from the spirit or scope of the techniques described herein, such as gaming services, productivity suite services, mapping services, location-based services, fitness-tracking services, health services, home-automation services, social networking services, financial services, and so forth. Due to this, a user interface having functionality for accessing a combination of services from the service provider system 102 and at least the depicted partner service provider system 104 may be configured in different ways than illustrated in accordance with the described techniques.

In any case, the illustrated example 200 represents a scenario in which the user 202 makes a selection via the user interface 204 to use a service of the service provider system 102 in connection with a service provided by the partner service provider system 104. Responsive to this selection, the service of the service provider system 102 is provided in part by initiating a partner-site session according to an improved session initiation protocol, the details of which are described in relation to FIG. 3.

With respect to the continuing example 200, arrows are depicted from the partner service provider system 104 and the service provider system 102 to the user interface 204. The arrow from the partner service provider system 104 to the user interface 204 represents provision of cloud-storage service 206. In this context, the user interface 204 is depicted including selectable representations of cloud-based file directories 208, e.g., 'Directory A', 'Directory B', 'Directory C', 'Directory E', and 'Directory F'. The user interface 204 is also depicted including selectable representations of cloud-maintained digital images 210, e.g., 'File 1.jpg', 'File 3.jpg', 'File 4.jpg', 'File 5.jpg', and 'File 6.jpg'. File selection indication 212 indicates that the selectable representation of the cloud-maintained digital image 210 named 'File 3.jpg' is selected by the user 202. In one or more implementations, the file selection indication 212 indicates that a focus of further operations is on the selectable representation of the cloud-maintained digital image 210 named 'File 3.jpg'.

The arrow from the service provider system 102 to the user interface 204 represents availability of content creation service 214 and stock content service 216 via the user interface 204—as configured for the cloud-storage service 206. In other words, this arrow indicates that the service provider system 102 is capable of providing the content creation service 214 and the stock content service 216 in connection with provision of the cloud-storage service 206 by the partner service provider system 104. Although the illustrated example 200 represents a scenario in which the service provider system 102 provides these two services, the service provider system 102 may make a different number of services (e.g., one or more than two) available in connection with the service(s) of the partner service provider system 104.

In one or more implementations, the services of the service provider system 102 are provided responsive to selection of an instrumentality included in or accessible by navigation through the user interface 204. In this context, the illustrated example 200 includes functionality selection indication 218, which indicates that the user 202 selects an instrumentality of the user interface 204 corresponding to the content creation service 214. By way of example, selection of this instrumentality may enable the service provider system 102 to provide content creation services (e.g., digital image editing functionality) for use in relation to services provided by the partner service provider system 104, such as content creation services in relation to the selected cloud-maintained digital image 210. In order to provide a service of the service provider system 102 in concert with the services of the partner service provider system 104, the application 112 initiates a partner-site session according to the improved protocol described as follows.

Figure 3:
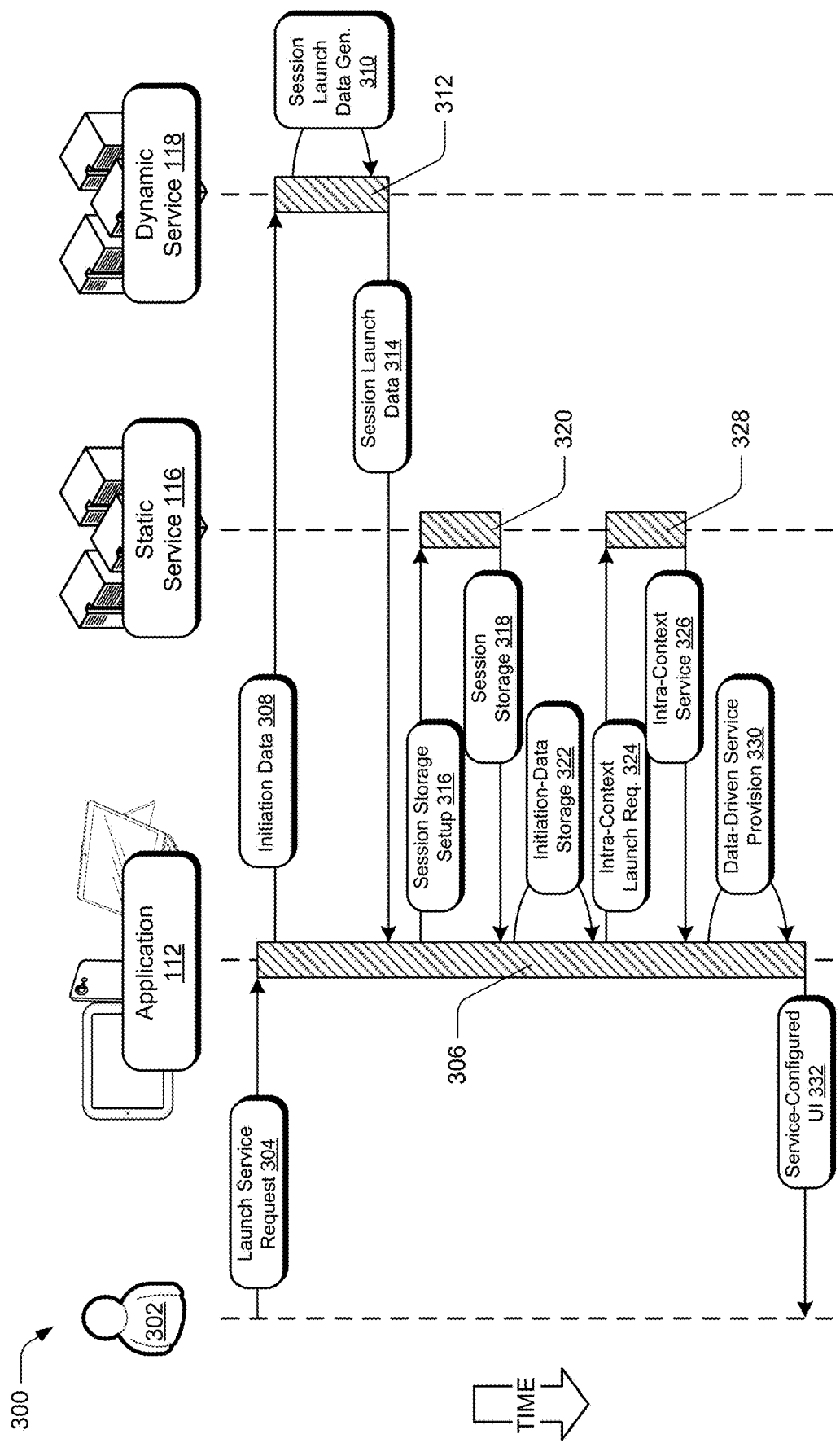
FIG. 3 depicts an example implementation of data flow according to a protocol to initiate a session securely with a partner site.

FIG. 3 depicts an example 300 implementation of a data flow according to a protocol to initiate a session securely with a partner site. This protocol improves security of information handling in connection with initiating partner-site sessions over conventional techniques that initiate partner-site sessions. Moreover, this protocol leverages information storage solely at the client device 106—storage of the service provider system 102 (e.g., the storage 122) is not leveraged.

The left side of the illustration includes an arrow pointing downward, which indicates passage of time in relation to the described data flow. To this end, events depicted at a top of the drawing occur at a point in time before events depicted at a bottom of the drawing. It follows too that an event depicted at a location above another event occurs at a point in time before the other event. Additionally, the hashed bars which span vertical lengths, each correspond to a span of time beginning approximately at a top of the bar and ending approximately at a bottom of the bar. Over time, the entities in the illustrated example 300 interact in the depicted, improved manner to initiate a partner-site session, e.g., to provide services of the service provider system 102 in concert with services of the partner service provider system 104.

The illustrated example 300 includes from FIG. 1, the application 112, the static service 116, and the dynamic service 118. The illustrated example 300 also includes user 302, which may correspond to the user 202 or any other user of the client device 106. In this example, consider the application 112 as a web browser, web-enabled application, or other similar type of application capable of interacting with service providers over the network 110. This protocol described in relation to FIG. 3 can be considered a set of instructions that direct the different entities (e.g., the application 112, the static service 116, and the dynamic service 118) to perform actions indicated by the illustrated data flow.

Initially, the user 302 provides launch service request 304 and the application 112 receives data indicative of the launch service request 304. In the context of FIG. 2, the launch service request 304 corresponds to the user 202's selection of the 'ACME Content Creation Service' instrumentality as indicated by the functionality selection indication 218. This selection may correspond to touch input provided via a touch-enabled display of the client device 106 and proximate the displayed instrumentality. Indeed, touch input is but one example, and other inputs may be received to launch a service request, such as voice commands, stylus input, gesture detection (e.g., waving of one or more hands or actions with feet), keyboard and/or mouse input, and so forth. Regardless, the client device 106 generates data indicative of the user input effective to provide the launch service request 304 to the application 112.

Responsive to receipt of the launch service request 304, the protocol directs the application 112 to initiate web session 306, which indicates interaction over a span of time between the application 112 and the service provider system 102.

Responsive to receipt of the launch service request 304, the protocol also directs the application 112 to collect information for launching the requested service, generate initiation data 308, and communicate the initiation data 308 for receipt by the dynamic service 118. As part of the generation, the application 112 incorporates the information collected for launching the requested service. In one or more implementations, the protocol directs the application to configure the initiation data 308 as a POST request, which includes information describing the launch service request 304 and the user 302. Generally speaking, a POST request is more secure and thus results in greater privacy of information than headers or envelopes of requests. This is because the content of a POST request is not logged, but a header or an envelope of a request may be logged. The initiation data 308 may thus be configured as a POST request describing an initial intent of the user 302 (e.g., in accordance with the launch service request 304), describing the user 302 (e.g., username to identify an authenticated user, temporary identifier to uniquely identify an unauthenticated user, and so on), location information, and so on. In any case, some of the information included in the initiation data 308 may be sensitive information, e.g., personally identifying information (PII). Using a POST request for the initiation data 308 contributes to limiting exposure of PII.

Responsive to receipt of the initiation data 308, the protocol directs the dynamic service 118 to generate a session identifier ("session-id") to uniquely identify the partner-site session between the service provider system 102 and the partner service provider system 104. Generation of this session-id is represented in the illustrated example 300 by session launch data generation 310. Dynamic service session 312 represents a span of time during which resources (e.g., hardware, computing time, etc.) of the dynamic service 118 are leveraged to generate the session-id.

As part of the dynamic service session 312, the protocol also directs the dynamic service 118 to generate session launch data 314 and communicate the session launch data 314 for receipt by the application 112. According to the protocol, the dynamic service 118 generates the session launch data 314, at least in part, by incorporating the generated session-id and incorporating at least some of the information included in the initiation data 308, e.g., information describing functionality to be exposed via the session, user identifier, and so forth. In one or more implementations, the protocol directs the dynamic service 118 to generate the session launch data 314 as hypertext markup language (HTML) with the session-id and the information extracted from the initiation data 308.

Responsive to receipt of the session launch data 314, the protocol directs the application 112 to initiate setup with the static service 116 of a hidden storage area in the security context of the application 112. In other words, this hidden storage area is created "in the" application 112, e.g., using storage allocated to the application 112. Initiation of this setup is represented by session storage setup 316. In one or more implementations, the session storage setup 316 represents a portion of code that stores data passed on by the application 112 before the data is further passed on to the partner service provider system 104, which surfaces the "rest" of the functionality via the application 112, e.g., cloud-storage service functionality as compared to the content creation services requested to invoke the partner-site session protocol.

One example of the hidden storage area is an iframe. In such scenarios, the protocol directs the application 112 to create an iframe in the context of the application 112, where setup of the iframe involves interaction with the static service 116. In the context of using iframes as the hidden storage, frames that are local to the client device 106 are created by the application 112 and without using storage of a service provider system, e.g., the storage 122 of the service provider system 102 by way of the storage service 120. Although iframes are used as an example, other mechanisms capable of storing interaction information for partner-site sessions (e.g., PII, requested services, etc.) may be leveraged without departing from the spirit or scope of the techniques described herein. In general, the hidden storage area is a storage mechanism for a separate security and storage context that supports secure inter-context communication.

Responsive to receipt of the request to initiate the session storage setup 316, the protocol directs the static service 116 to generate and configure session storage 318, which the application 112 uses to launch the partner-site session. First static service session 320 represents a first span of time during which resources (e.g., hardware, computing time, etc.) of the static service 116 are leveraged to configure the session storage 318. The first static service session 320 also represents operations of the static service 116 to communicate the session storage 318 to the application 112 in accordance with the protocol. This configuring and communication of the session storage 318 may be referred to as "allocating" the session storage 318 to the application 112. In one or more implementations, the protocol directs the static service 116 to configure the session storage 318 to include one or more of an iframe, hypertext markup language (HTML), and JavaScript for launching the partner-site session. The session storage 318 may include more or different information configured during the first static service session 320 in accordance with the described techniques.

Responsive to receipt of the session storage 318, the protocol directs the application 112 to create the hidden storage area (e.g., iframe) in the security context of the application 112. The application 112 does so using the configured session storage 318. According to the protocol, the application 112 also stores the initiation data 308 in the created hidden storage area. These operations are represented by initiation-data storage 322. In addition to the initiation data 308, the hidden storage area can be used to store the session-id included with the session launch data 314. In one or more implementations, the protocol directs the application 112 to store the initiation data 308 using the session storage 318 by leveraging a safe cross-origin communication, such as by a using a 'postMessage' function.

Responsive to the initiation-data storage 322, the protocol directs the application 112 to generate and communicate the intra-context launch request 324. The intra-context launch request 324 represents data requesting to launch the partner-site session according to the protocol in the security context of the service provider system 102. By way of example, the intra-context launch request 324 represents a request to launch a version of the partner service provider system 104's website where the user interface is configured with the functionality of the service provider system 102. The intra-context request 324 further serves as a notification, where the abstract non-personally identifying information such as the session identifier ("session-id") can be securely passed according to the protocol at the application 112 level between services of the partner service provider system 104 and the service provider system 102. This passing of the abstract, non-personally identifying information session-id enables the intra-context request 324 to be configured with the corresponding initiation data 308 stored during the initiation-data storage 322 based on the session-id. Summarily, the session initiation data 308 for the intra-context launch is stored according to the protocol in a local, secure sub-context on the application 112 rather than on a cloud service. The protocol thus further minimizes the exposure of the initiation data 308 in relation to systems that employ conventional protocols which involve storage of session initiation data on a cloud service.

Based on receipt of the intra-context launch request 324, the protocol directs the static service 116 to provide the intra-context service 326 to the application 112. The intra-context service 326 represents code of the service provider system 102 to provide the service provider system 102's respective functionality according to the protocol as part of the partner-site session with potentially personally identifying information retrieved from initial-data storage by the session identifier ("session-id"). In the context of FIG. 2, for instance, the intra-context service 326 provides code for content creation functionality, such as to perform content edits on the cloud-maintained digital images 210 maintained by the partner service provider system 104. Second static service session 328 represents a second span of time during which the resources (e.g., hardware, computing time, etc.) of the static service 116 are leveraged. In particular, these resources are leveraged according to the protocol to provide code for surfacing a user interface of the application 112 with the requested functionality activated. Prior to provision of the intra-context service 326, the functionality corresponding to the requested services is not activated for use, e.g., the application 112 cannot carry out operations (e.g., content editing operations) associated with the requested functionality until receipt of the intra-context service 326. In one or more implementations, the intra-context service 326, as provided by the static service 116 according to the protocol, includes at least one of static HTML, Cascading Style Sheets (CSS), and JavaScript. The static service 116 may configure the intra-context service 326 for provision to the application 112 in different ways without departing from the spirit or scope of the described techniques.

In this context, consider data-driven service provision 330. In accordance with the described systems, the data-driven service provision 330 represents operations performed by the application 112—and in the security context of the application 112—to manipulate data according to the protocol using services of the partner service provider system 104 and services of the service provider system 102. In the continuing example, the data-driven service provision 330 represents operations performed by the application 112 to edit digital content files, where the digital content files are maintained using the cloud-storage service 206 of the partner service provider system 104 and edited using content editing tools of the service provider system 102. As discussed above, this is but one example of functionalities that may be provided via partner-site sessions according to the protocol. Indeed, other functionalities may be provided via partner-site sessions in accordance with the described techniques.

Based on the data-driven service provision 330, the protocol directs the application 112 to generate service-configured user interface 332 ("service-configured UI 332"). The application 112 causes the service-configured UI 332 to be presented, such as for display via a display device associated with the client device 106, for audible output via one or more speakers associated with the client device 106, for display as virtual and/or augmented reality content, and so forth. In any case, the service-configured UI 332 enables the user 302 to interact with the client device 106 to leverage the requested functionality. In the context of FIG. 2, for instance, the service-configured UI 332 may include content editing tools, a content editing workspace, and so on, that enables the user 302 to provide editing inputs to edit digital content maintained by cloud-storage service of the partner service provider system 104.

In contrast to conventional systems, the above-described protocol of FIG. 3 does not involve communication with and/or use of the storage service 120 or the storage 122 of the service provider system 102. As noted above, this eliminates communication and storage of potentially sensitive information by the service provider system 102. Another improvement of this protocol over conventional partner-site session initiation protocols is that the improved protocol is request based, such that a burden is not placed on computing resources of the service provider system 102 until a request for services is made (via the launch service request 304). The improved protocol discussed in relation to FIG. 3 is also asynchronous, allowing the services of the service provider system 102 to generate and deliver the illustrated information as computing resources become available—rather than synchronously.

Broadly speaking, the improved protocol involves fewer communications in which potentially sensitive information is communicated outside a secure context of the application 112. As a result, the improved protocol involves less exposure of potentially sensitive information. By limiting a number of times that potentially sensitive information is exposed, the improved protocol reduces opportunities for that information to be maliciously obtained. Due to this, the improved protocol is more secure than conventional protocols for initiating partner-site sessions. As an example of a conventional protocol, consider FIG. 4.

Figure 4:
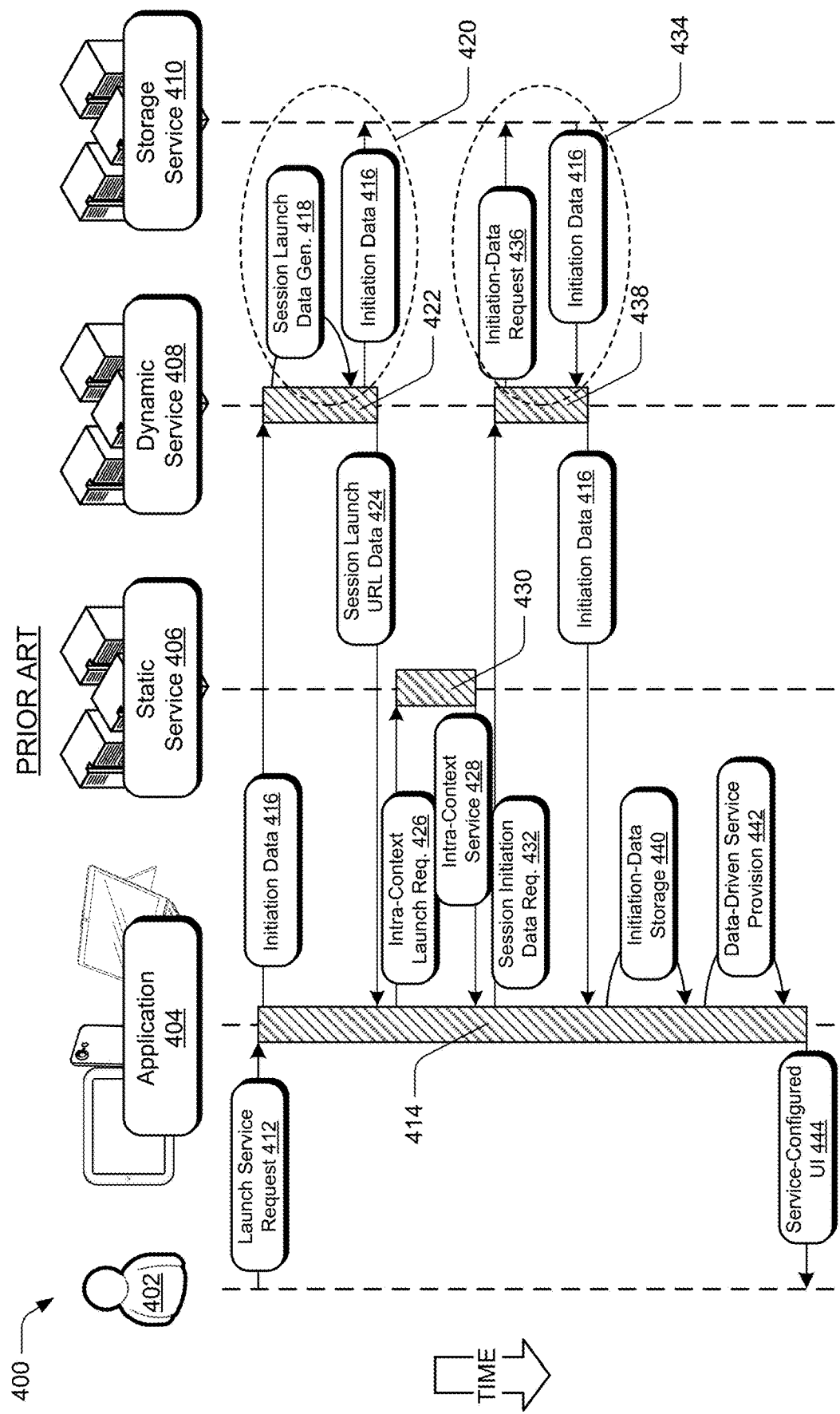
FIG. 4 depicts a different example of data flow according to a conventional protocol to initiate a session with a partner site.

FIG. 4 depicts an example 400 implementation of a data flow according to a conventional protocol to initiate a session with a partner site. In contrast to the above-described protocol of FIG. 3, the following conventional protocol implemented by conventional systems includes more communications and also communicates potentially sensitive information off a client device for remote storage at a service provider system. These characteristics of the conventional protocol make it more vulnerable to attacks for acquiring sensitive information than the improved protocol described in relation to FIG. 3.

The left side of the illustrated example 400 includes an arrow pointing downward, which indicates passage of time in relation to the following described data flow.

The illustrated example 400 includes user 402, application 404, static service 406, dynamic service 408, and storage service 410. In this example, the application 404 may be executed on a client device. Further, the static service 406, the dynamic service 408, and the storage service 410 may be included or otherwise accessible by a service provider system. The application 404 may be configured to communicate or otherwise access the illustrated services over a network, such as the network 110.

In accordance with the conventional protocol, the user 402 provides launch service request 412 and the application 404 receives data indicative of the launch service request 412. Broadly speaking, the launch service request 412 may include similar information as the launch service request 304, e.g., data indicating the user has selected to launch a service via a user interface that will require interaction between services of at least two service provider systems.

Responsive to receipt of the launch service request 412, the application 404 initiates web session 414, which represents interaction over a span of time between the application 404 and a service provider system corresponding to the static service 406, the dynamic service 408, and the storage service 410. Responsive to receipt of the launch service request 412, the application 404 also collects information for launching the requested service, generates initiation data 416, and communicates the initiation data 416 for receipt by the dynamic service 408. As part of this generation, the application 404 incorporates the information collected to launch the requested service. Like the initiation data 308, the initiation data 416 may be configured as a POST request, which includes information describing the launch service request 412 and the user 402. Accordingly, some of the information included in the initiation data 416 may be sensitive information, e.g., personally identifying information (PII).

Responsive to receipt of the initiation data 416, the dynamic service 408 generates a session identifier ("session-id") to uniquely identify a partner-site session for the partner services of the illustrated example 400. Generation of the session-id is represented in the illustrated example 400 by session launch data generation 418.

Unlike the improved protocol illustrated in FIG. 3, the conventional protocol of the illustrated example 400 includes interaction of the dynamic service 408 with the storage service 410. In particular, the conventional protocol directs the dynamic service 408 to communicate the initiation data 416 to the storage service 410 for storage. This communication to the storage service 410 is depicted at 420. Notably, the improved protocol does not cause this communication of data to the storage service 410 illustrated at 420. As noted above, the improved protocol instead directs the session initiation data 308 to be stored for the intra-context launch in a local, secure sub-context on the application 112 rather than on a cloud service. This further minimizes the exposure of the initiation data 308 in relation to systems that store session initiation data as discussed in relation to FIG. 4.

First dynamic service session 422 represents a first span of time during which resources of the dynamic service 408 are leveraged to generate the session-id as well as communicate the initiation data 416 to the storage service 410. As part of the first dynamic service session 422, the conventional protocol also directs the dynamic service 408 to generate session launch uniform resource locator (URL) data 424. The dynamic service 408 generates the session launch URL data 424, at least in part, by incorporating the generated session-id into a URL, e.g., a redirect URL. Accordingly, the conventional protocol exposes the session-id as part of a URL. This conventional configuration, with the session-id in a URL, contrasts with the session launch data 314. As noted above, the session launch data 314 may be configured as HTML having at least some of the initiation data 308 and session-id in accordance with the improved protocol.

Responsive to receiving the session launch URL data 424, the conventional protocol directs the application 404 to generate intra-context launch request 426 for communication to the static service 406. This also contrasts with the improved protocol, which involves creation of a hidden storage area in the security context of the application 112 before communication of the intra-context launch request 324. Continuing with the illustrated example 400, the static service 406 provides the intra-context service 428 to the application 404. Static service session 430 represents a span of time during which resources of the static service 406 are leveraged to provide code for surfacing a user interface of the application 404 with the requested functionality activated.

Further in contrast with the improved protocol, the conventional protocol involves a second interaction between the application 404 and the dynamic service 408. As depicted in FIG. 3, the improved protocol is limited to a single session of interaction between the application 112 and the dynamic service 118. This second interaction of the conventional protocol includes communication of a session initiation data request 432 from the application 404 to the dynamic service 408. In at least some conventional approaches, the session initiation data request 432 represents a request to fetch the initiation data 416. By way of example, the session initiation data request 432 includes the session-id, which may be used by the storage service 410 to look up the initiation data 416 in storage according to the conventional protocol. To this end, the communication of the session initiation data request 432 according to the conventional protocol results in exposure of the session-id, such as to potentially malicious attacks for obtaining PII.

The conventional protocol of the illustrated example 400 also includes a second interaction between the dynamic service 408 and the storage service 410, which is illustrated at 434. In accordance with the conventional protocol, the dynamic service 408 communicates an initiation-data request 436 to the storage service 410. Based on receipt of the initiation-data request 436, the storage service 410 looks up the initiation data 416 by session-id. As depicted at 434, the storage service 410 communicates the located initiation data 416 back to the dynamic service 408 in accordance with the conventional protocol. Communication of the initiation data 416 at 434 represents another exposure of potentially sensitive information due to the conventional protocol. Second dynamic service session 438 represents a second span of time during which resources of the dynamic service 408 are leveraged according to the conventional protocol, e.g., to acquire the initiation data 416 from storage. By way of comparison, the improved protocol does not include a second dynamic service session 438 and also does not include interaction between a dynamic service and storage service to fetch initiation data. In any case, the conventional protocol directs the dynamic service 408 to communicate the initiation data 416 to the application 404 as part of the second dynamic service session 438.

Responsive to receipt of the initiation data 416, the application 404 can store the initiation data 416 with session storage. This storage operation is represented by initiation-data storage 440. Once the application 404 performs the initiation-data storage 440, the application 404 can perform data-driven service provision 442. The data-driven service provision 442 represents operations performed by the application 404—in the security context of the application 404— to manipulate data using services of partner service providers. Further, the application 404 causes presentation of a service-configured user interface 444 to the user 402.

Broadly speaking, the user experiences of the users 302, 402 may be similar. In other words, the user selections made by the users 302, 402 and the user interfaces presented to provide services of partner sessions may be similar. The protocols used to deliver those user experiences to the users 302, 402 are different, however. By delivering partner services through a partner-service session initiated according to the improved protocol, for instance, the application 112, the static service 116, and the dynamic service 118 more securely handle potentially sensitive information associated with the user 302 than the user 402's information is handled by the application 404, the static service 406, the dynamic service 408, and the storage service 410. This is due to the illustrated and described differences between the improved protocol discussed in relation to FIG. 3 and conventional protocols, an example of which is discussed in relation to FIG. 4.

Having discussed example details of the techniques for a protocol to initiate a session with a partner site, consider now some example procedures to illustrate additional aspects of the techniques.

Example Procedures

This section describes example procedures of a protocol to initiate a session with a partner site in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the client device 106 of FIG. 1 that makes use of a communication module 114.

Figure 5:
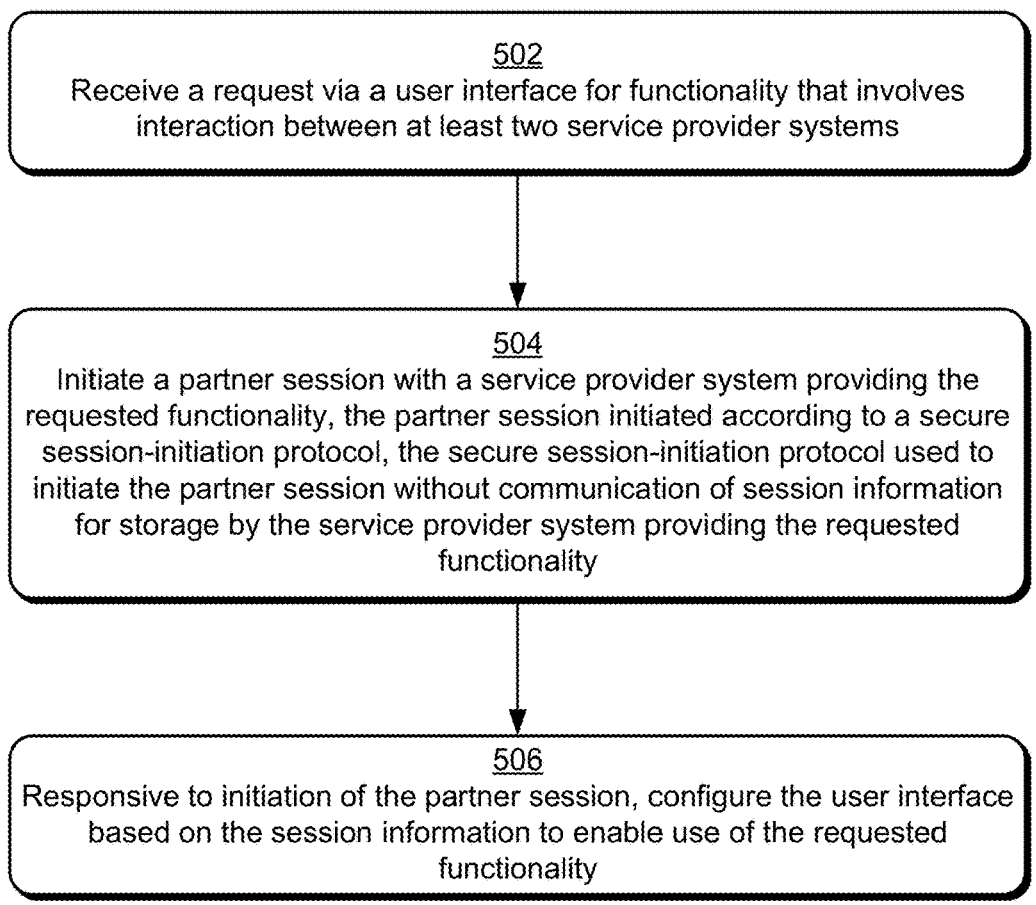
FIG. 5 depicts a procedure in an example implementation in which functionality associated with multiple service provider systems is provided using an integrated session between those service providers and in which the integrated session is initiated according to a secure session-initiation protocol.

FIG. 5 depicts an example procedure 500 in which functionality associated with multiple service provider systems is provided using an integrated session between those service providers and in which the integrated session is initiated according to a secure session-initiation protocol.

A request is received via a user interface for functionality that involves interaction between multiple service provider systems (block 502). By way of example, user input is received via the user interface 204 requesting functionality that involves interaction between the service provider system 102 and the partner service provider system 104. Such user input is indicated by the functionality selection indication 218, which indicates selection of an instrumentality corresponding to functionality of the service provider system 102 (e.g., content creation functionality) that is usable in relation to functionality of the partner service provider system 104 (e.g., stored data files). As discussed above and below, other functionality may involve interaction between multiple service provider systems and serve as a basis for initiating partner sessions.

A partner session is initiated with the service provider system of the multiple service provider systems that provides the requested functionality (block 504). In accordance with the principles discussed herein, the partner session is initiated according to a secure session-initiation protocol and the secure session-initiation protocol is used to initiate the partner session without communication of session information for storage by the service provider system. By way of example, the application 112 initiates a partner session with the service provider system 102 to provide the functionality requested by the request received at block 502. The application 112 initiates this partner session according to the protocol discussed in relation to FIG. 3, which does not involve the application 112 communicating session information for storage by the service provider system 102, e.g., it does not involve communications with the storage service 120 or storage of session information in the storage 122. As discussed above, the protocol of FIG. 3 differs from conventional session-initiation protocols that do leverage storage of a service provider system in connection with initiation of partner-site sessions.

The user interface is configured based on the session information to enable use of the requested functionality responsive to initiation of the partner session (block 506). By way of example, the application 112 configures the user interface 204 based on the session information to enable use of the requested functionality. In particular, the application 112 configures the user interface 204 in this way responsive to initiation of the partner session at block 504. The application 112 then causes output of the configured user interface, e.g., output of the service-configured UI 332.

Figure 6A:
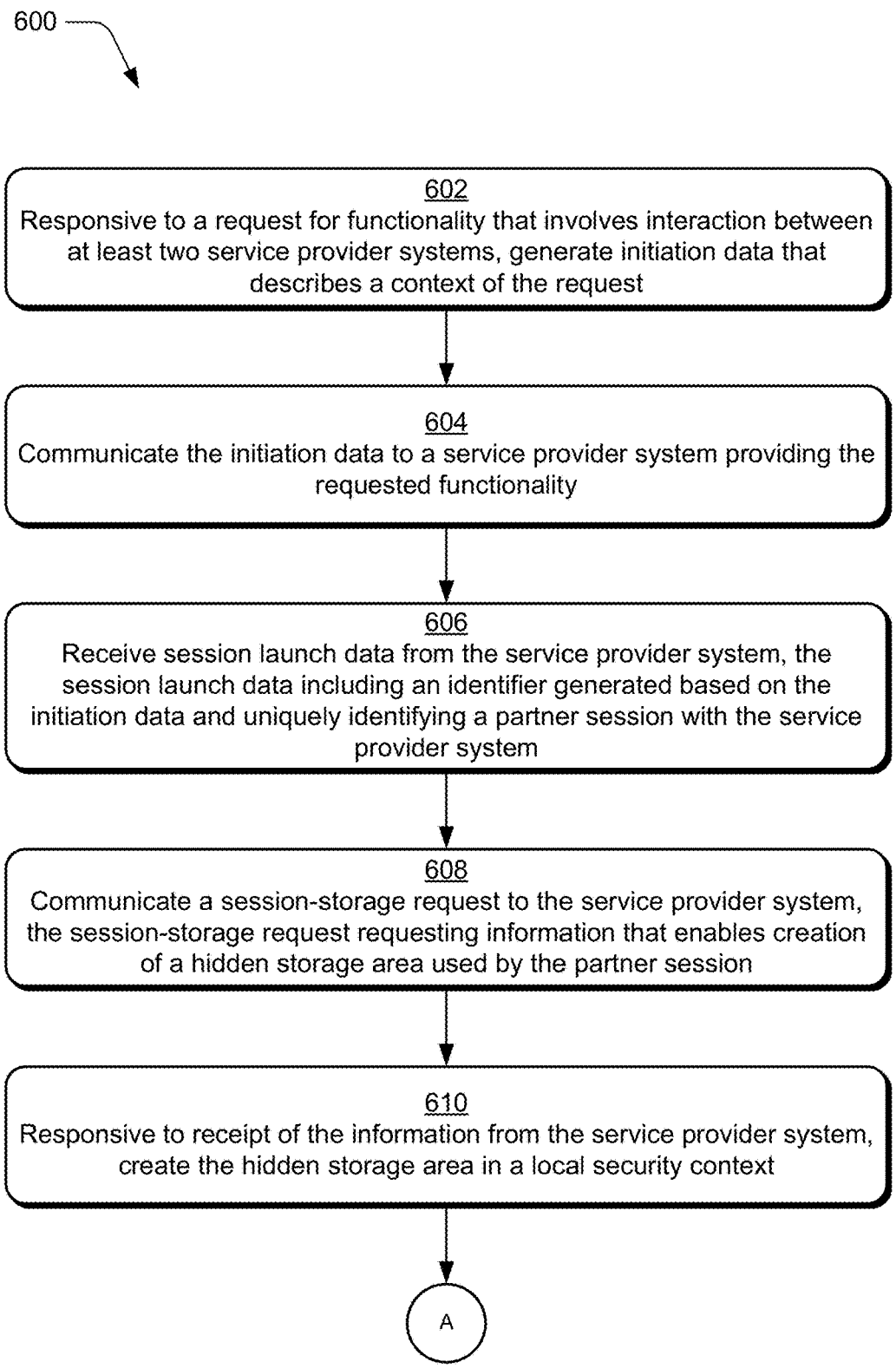
FIGS. 6A and 6B depict a procedure in an example implementation in which data handling for initiation of a session between multiple service providers is controlled according to a secure session-initiation protocol.
Figure 6B:
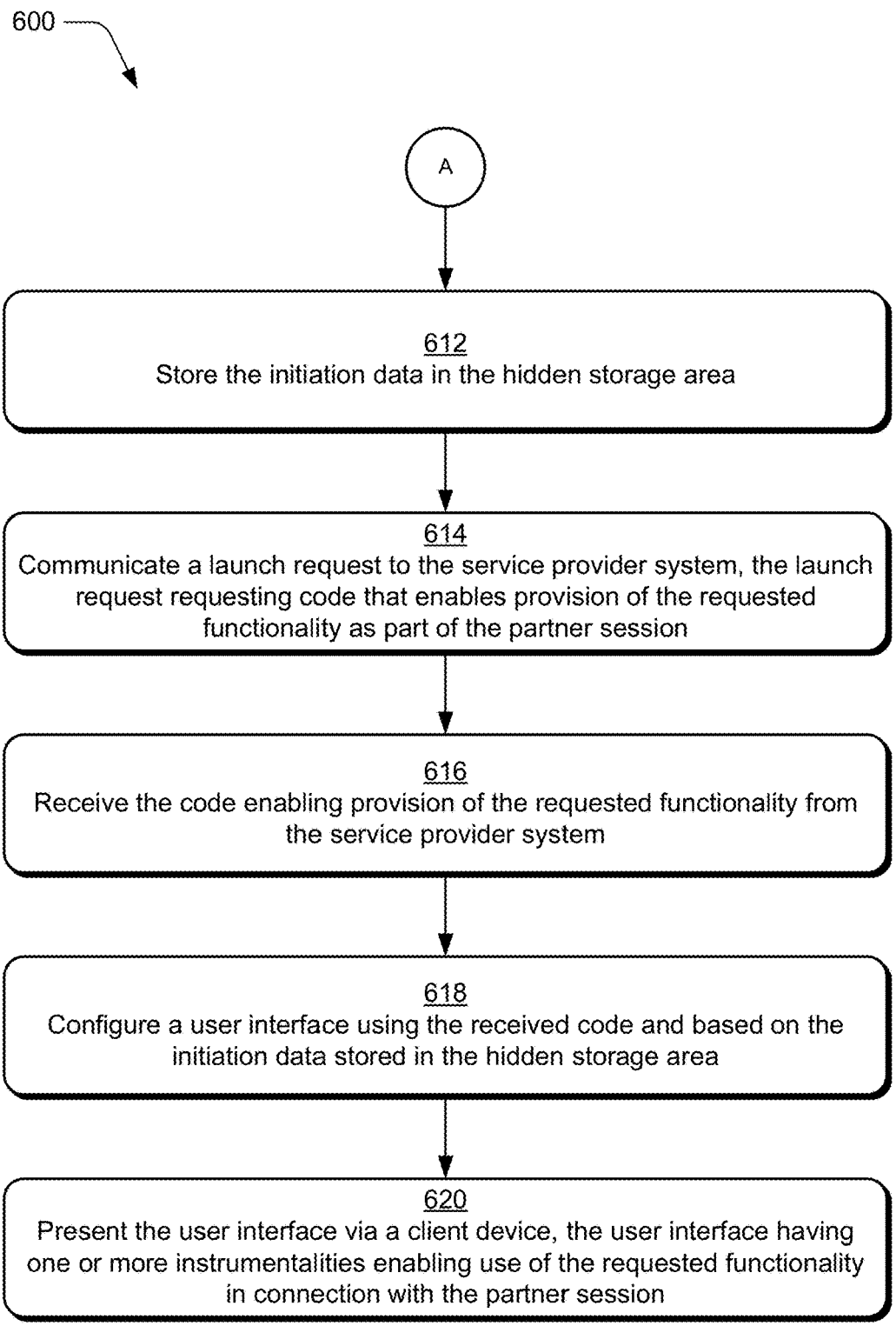

FIGS. 6A and 6B depict an example procedure 600 in which data handling for initiation of a session between multiple service providers is controlled according to a secure session-initiation protocol.

Responsive to a request for functionality that involves interaction between multiple service provider systems, initiation data is generated that describes a context of the request (block 602). In accordance with the principles discussed herein, the initiation data describes the functionality requested, attributes of a user requesting the functionality, attributes of an application via which the functionality is requested, attributes of one or more devices associated with the request, and so forth. Responsive to the launch service request 304, for instance, the application 112 generates the initiation data 308. In one or more implementations, the application 112 collects information describing the context from different sources, e.g., local storage of the client device 106, application settings, an operating system of the client device 106, and so forth.

The initiation data is communicated to a service provider system providing the requested functionality (block 604). In accordance with the principles discussed herein, however, a storage service of the service provider system and its associated storage are not used to store any of the initiation data. By way of example, the application 112 communicates the initiation data 308 to the dynamic service 118 of the service provider system 102.

Session launch data is received from the service provider system (block 606). In accordance with the principles discussed herein, the session launch data includes an identifier generated based on the initiation data and uniquely identifying a partner session involving the service provider system. By way of example, the application 112 receives the session launch data 314 from the dynamic service 118. In one or more implementations, the session launch data 314 includes an identifier (e.g., session-id) that is generated by the dynamic service 118 based on the initiation data 308 and that uniquely identifies the partner session being created to integrate functionality of the service provider system 102 and the partner service provider system 104.

A session storage request is communicated to the service provider system (block 608). The session storage request requests information that enables creation of a hidden storage area for use in connection with the partner session. By way of example, the application 112 communicates the session storage setup 316 to the static service 116 of the service provider system 102.

Responsive to receipt of the information from the service provider system, the hidden storage area is created in a local security context (block 610). By way of example, the application 112 receives the session storage 318 from the static service 116 of the service provider system 102. Responsive to receipt of the session storage 318, the application 112 creates a hidden storage area in a security context of the application 112. As discussed above, the application 112 creates the hidden storage area as an iframe in the security context of the application 112. The procedure 600 continues at 'A' from FIG. 6A to FIG. 6B. The initiation data is stored in the hidden storage area (block 612). By way of example, the application 112 stores the initiation data 308 in the hidden storage area created at block 610.

A launch request is communicated to the service provider system (block 614). In accordance with the principles discussed herein, the launch request requests code that enables provision of the requested functionality as part of the partner session. By way of example, the application communicates the intra-context launch request 324 to the static service 116 of the service provider system 102. The code enabling provision of the requested functionality is received from the service provider system (block 616). By way of example, the application 112 receives the intra-context service 326 from the static service 116 of the service provider system 102.

A user interface is configured using the code and based on the initiation data stored in the hidden storage area (block 618). By way of example, the application 112 configures a user interface for output via the client device 106 using code received as part of the intra-context service 326 and based on the initiation data 308. The service-configured UI 332 is an example of such as user interface configured by the application 112. Such configuring may comprise at least one of the operations performed by the application 112 as part of the data-driven service provision 330.

The user interface is presented via a client device (block 620). In accordance with the principles discussed herein, the user interface includes one or more instrumentalities enabling use of the requested functionality in connection with the partner session. By way of example, the application 112 outputs the service-configured UI 332 via output mechanisms associated with the client device 106. Such output mechanisms may include, but are not limited to, display devices, speakers, peripheral devices, virtual and/or augmented reality devices, and so forth.

Having described example procedures in accordance with one or more implementations, consider now an example system and device that can be utilized to implement the various techniques described herein.

Example System and Device

Figure 7:
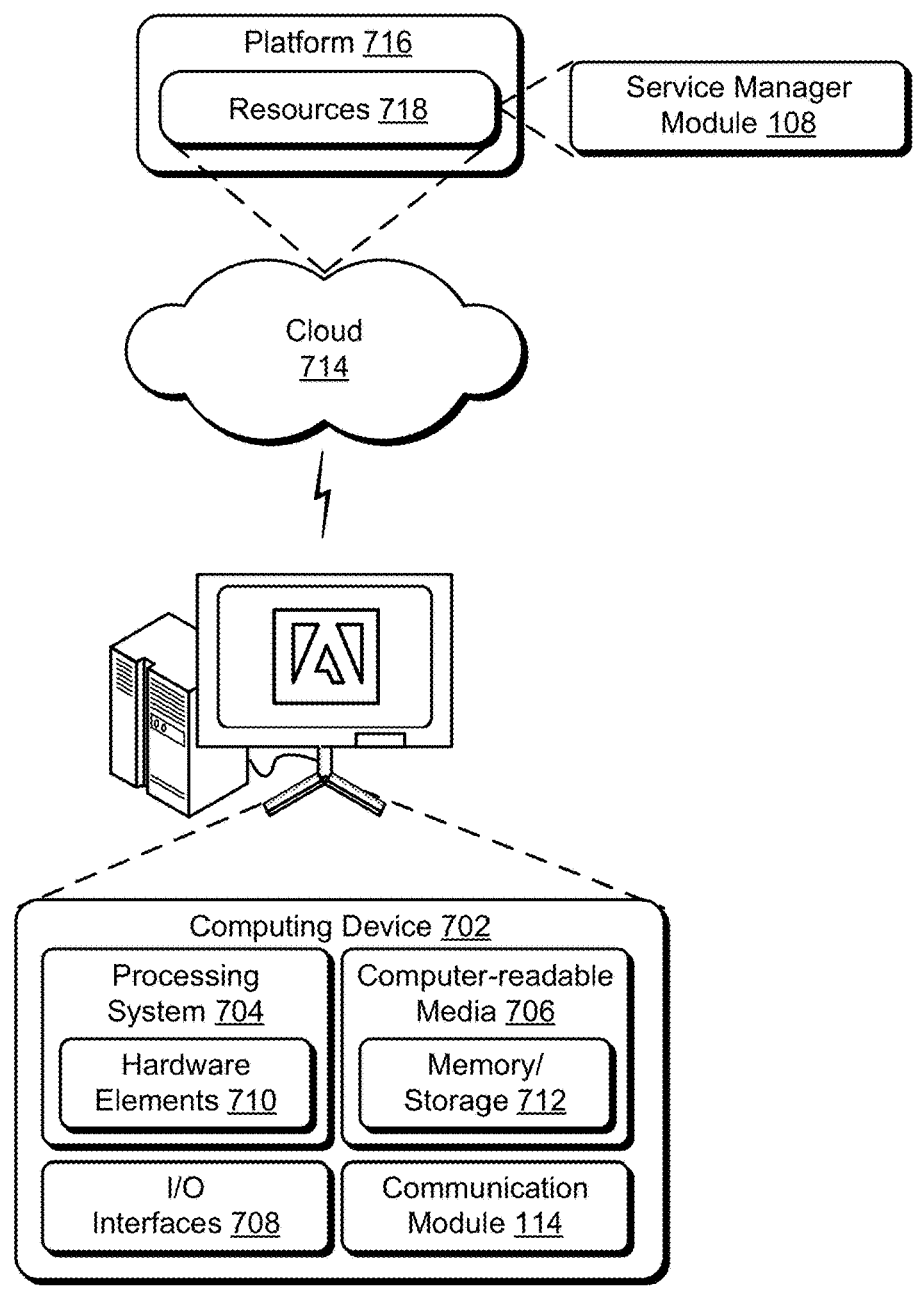
FIG. 7 illustrates an example system including various components of an example device that can be implemented as any type of computing device as described and/or utilized with reference to FIGS. 1-6B to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the service manager module 108 and the communication module 114. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   obtaining information in connection with a request for functionality of a first service provider system, the request requesting use of the functionality with an application of a second service provider system, the information including at least one item of sensitive information associated with a user of the application;
   receiving launch data from the first service provider system, the launch data being generated by the first service provider system and including the at least one item of sensitive information and a session identifier that identifies a session of the use, the at least one item of sensitive information being communicated to the first service provider system for generation of the launch data without the first service provider system communicating the at least one item of sensitive information to a storage service associated with the first service provider system;
   storing the session identifier in a hidden storage area created local to the application for the session; and
   surfacing the functionality via the application using the session identifier and the at least one item of sensitive information.

2. The method as described in claim 1, further comprising creating the hidden storage area local to the application using storage allocated to the application by the first service provider system.

3. The method as described in claim 1, wherein the hidden storage area is created in a security context of the application.

4. The method as described in claim 1, wherein the hidden storage area comprises an iframe.

5. The method as described in claim 1, wherein the functionality of the first service provider system is one of content creation functionality or content editing functionality.

6. The method as described in claim 1, wherein the functionality of the first service provider system is associated with a productivity suite.

7. The method as described in claim 1, wherein the application of the second service provider system is one of a social networking application or a cloud storage application.

8. The method as described in claim 1, wherein the at least one item of sensitive information includes personally identifying information.

9. The method as described in claim 1, wherein the functionality is surfaced via a user interface of the application, the user interface facilitating interaction with a service of the first service provider system together with a service of the second service provider system.

10. A system comprising:
    an application implemented at least partially in hardware of a computing device, the application associated with a first service provider system to:
    obtain information in connection with a request for functionality of a second service provider system for use with the application, the information including at least one item of sensitive information associated with a user of the application;
    receive launch data from the second service provider system, the launch data being generated by the second service provider system and including the at least one item of sensitive information and a session identifier that identifies a session of the use, the at least one item of sensitive information being communicated to the second service provider system for generation of the launch data without the second service provider system communicating the at least one item of sensitive information to a storage service associated with the second service provider system;
    store the session identifier in a hidden storage area created local to the application for the session; and
    surface the functionality via the application using the session identifier and the at least one item of sensitive information.

11. The system as described in claim 10, wherein the application is further configured to create the hidden storage area local to the application using storage allocated to the application by the second service provider system.

12. The system as described in claim 10, wherein the hidden storage area is created in a security context of the application.

13. The system as described in claim 10, wherein the hidden storage area comprises an iframe.

14. The system as described in claim 10, wherein the functionality of the second service provider system is one of content creation functionality or content editing functionality.

15. The system as described in claim 10, wherein the functionality of the second service provider system is associated with a productivity suite.

16. The system as described in claim 10, wherein the application of the first service provider system is one of a social networking application or a cloud storage application.

17. The system as described in claim 10, wherein the at least one item of sensitive information includes personally identifying information.

18. One or more computer-readable storage media having instructions stored thereon that are executable by one or more processors to perform operations comprising:

obtaining information in connection with a request for functionality of a first service provider system, the request requesting use of the functionality with an application of a second service provider system, the information including at least one item of sensitive information associated with a user of the application;

receiving launch data from the first service provider system, the launch data being generated by the first service provider system and including the at least one item of sensitive information and a session identifier that identifies a session of the use, the at least one item of sensitive information being communicated to the first service provider system for generation of the launch data without the first service provider system communicating the at least one item of sensitive information to a storage service associated with the first service provider system;

storing the session identifier in a hidden storage area created local to the application for the session; and surfacing the functionality via the application using the session identifier and the at least one item of sensitive information.

19. The one or more computer-readable storage media as described in claim 18, wherein the functionality of the first service provider system is one of content creation functionality or content editing functionality.

20. The one or more computer-readable storage media as described in claim 18, wherein the functionality of the first service provider system is associated with a productivity suite.

\* \* \* \* \*